Feb. 13, 1934.  A. G. RAYBURN  1,947,358
TORQUE RESISTING ARRANGEMENT FOR VEHICLES
Original Filed April 2, 1930  3 Sheets-Sheet 1
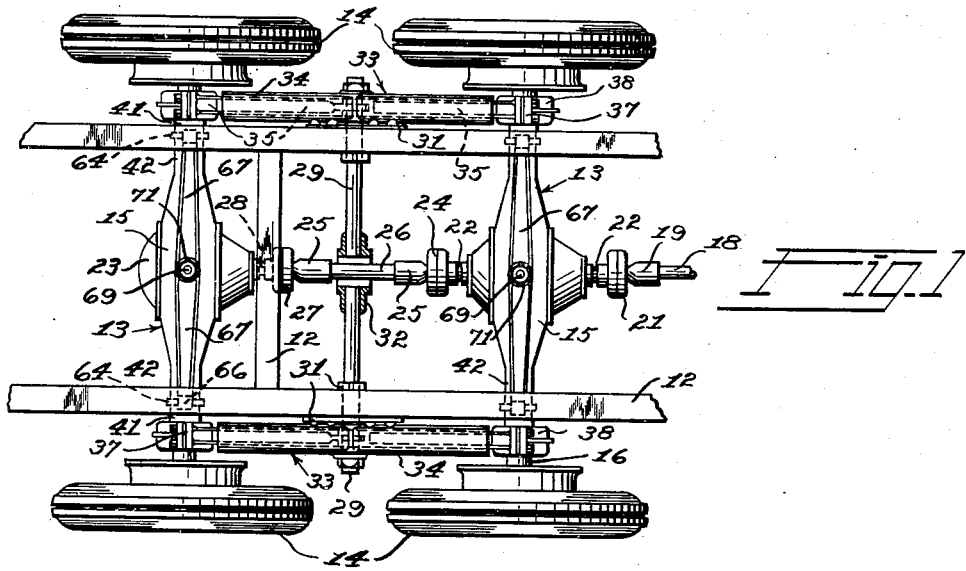
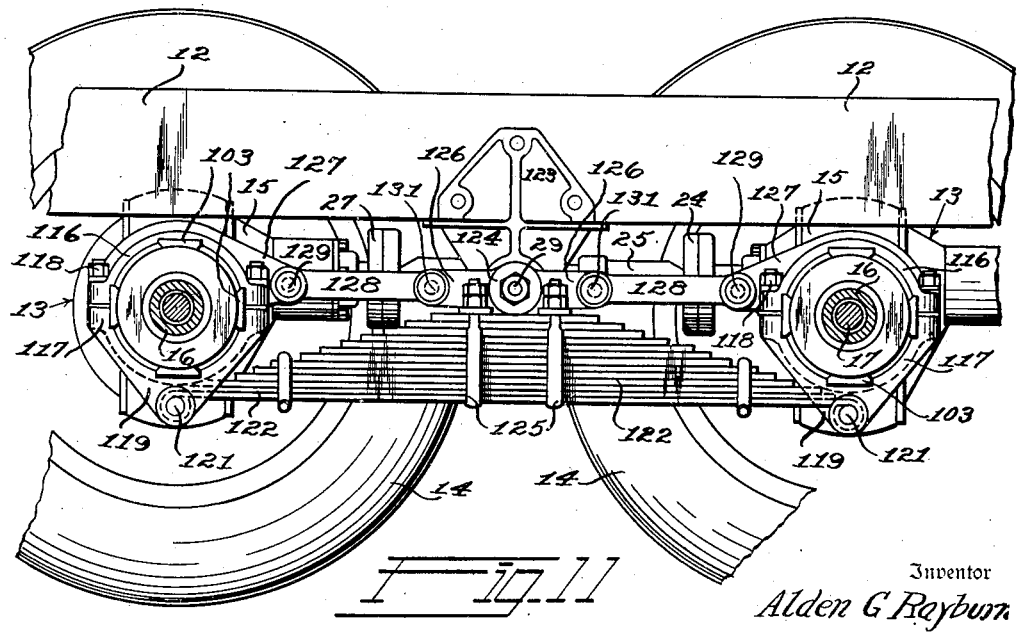
Inventor
Alden G. Rayburn
By Strauch & Hoffman
Attorneys Feb. 13, 1934.  A. G. RAYBURN  1,947,358
TORQUE RESISTING ARRANGEMENT FOR VEHICLES
Original Filed April 2, 1930   3 Sheets-Sheet 2
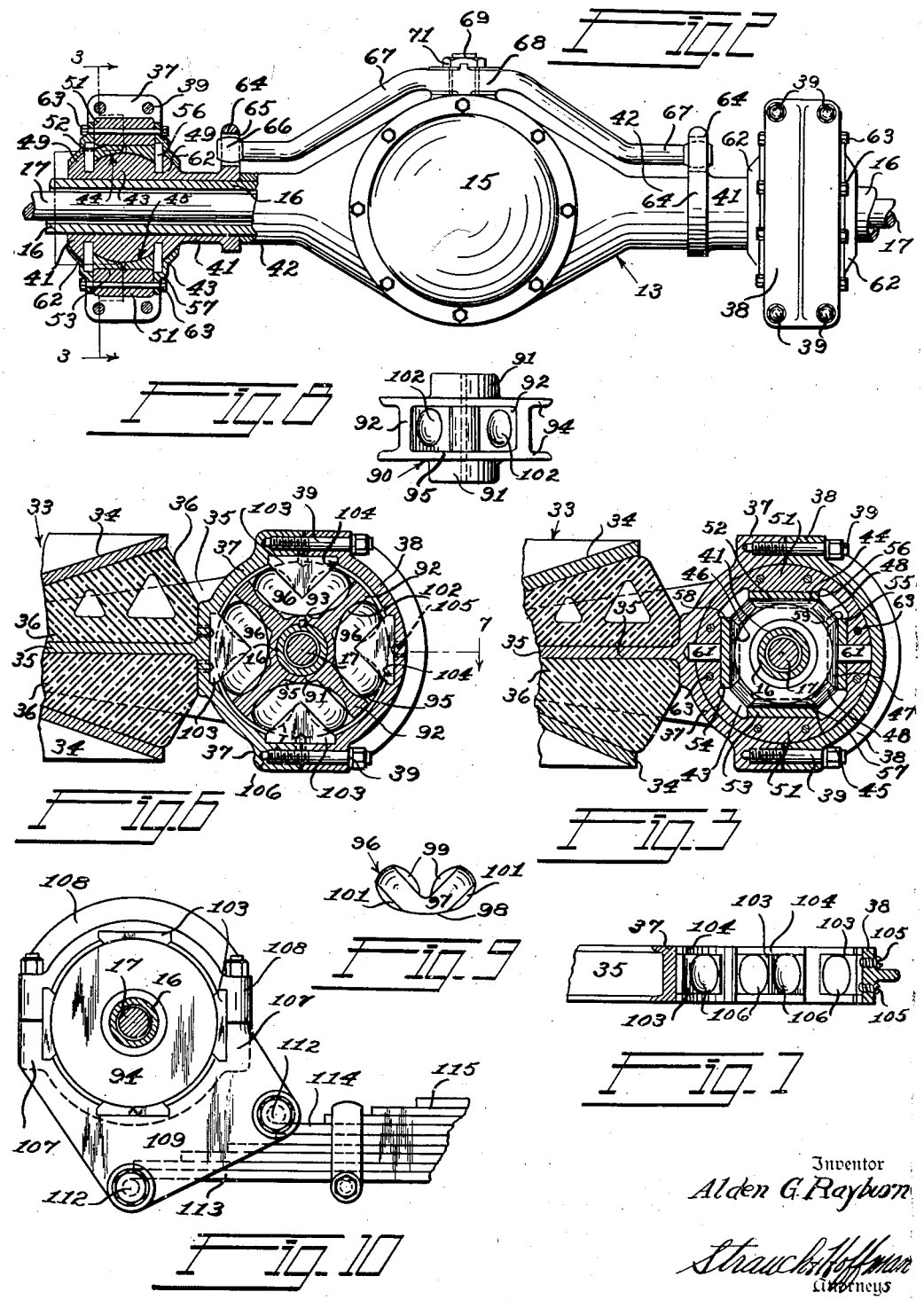
Inventor
Alden G. Rayburn Feb. 13, 1934. A. G. RAYBURN 1,947,358
TORQUE RESISTING ARRANGEMENT FOR VEHICLES
Original Filed April 2, 1930 3 Sheets-Sheet 3
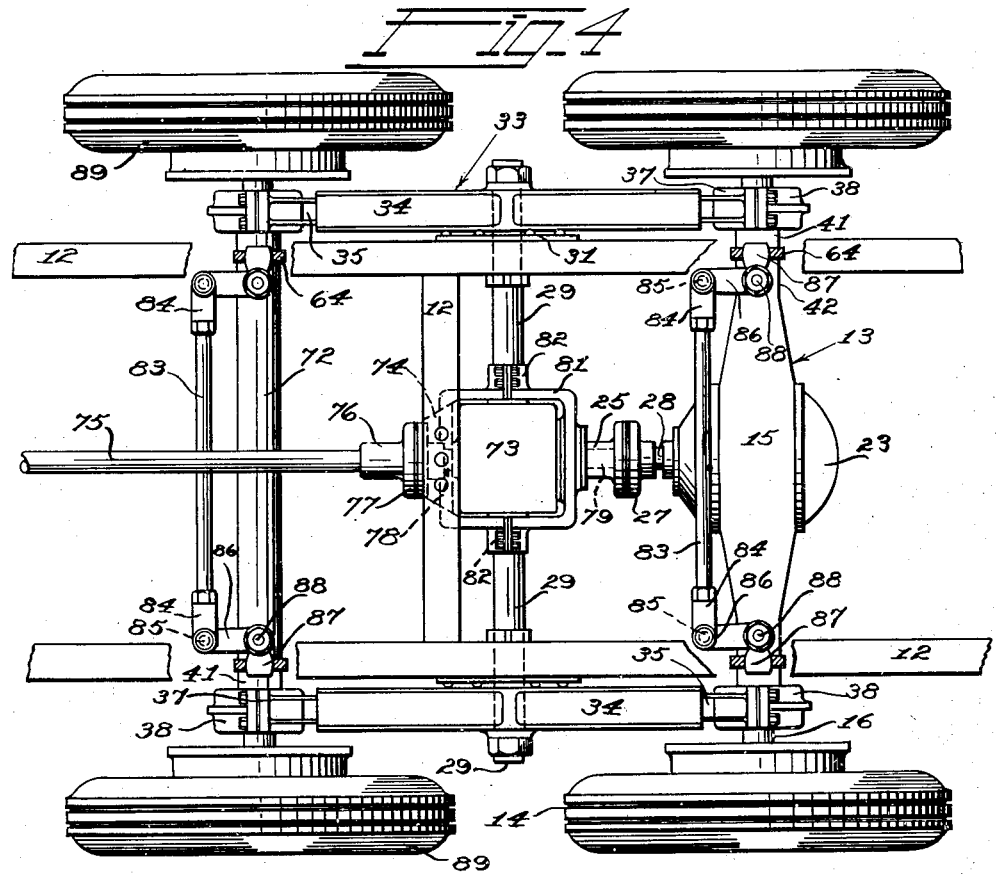
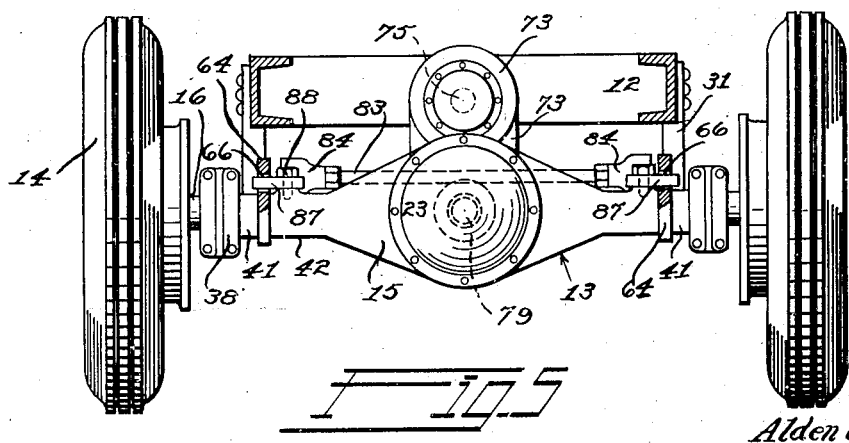
Inventor
Alden G. Rayburn
Strauch + Hoffman
Attorneys Patented Feb. 13, 1934

1,947,358

UNITED STATES PATENT OFFICE

1,947,358

TORQUE-RESISTING ARRANGEMENT FOR VEHICLES

Alden G. Rayburn, Sausalito, Calif., assignor, by mesne assignments, to Automotive Engineering Corporation, a corporation of Delaware Application April 2, 1930, Serial No. 441,119
Renewed July 10, 1933

16 Claims. (Cl. 180—22)

This invention relates to arrangements designed to oppose the driving and braking torque reactions in automotive vehicles, particularly road vehicles and vehicles of the type wherein a pair or more of closely spaced tandem axles is employed.

Torque-resisting devices for preventing rotation of an axle in response to driving or braking reactions must in order to be commercially practicable and workable under all operating conditions, be so designed and incorporated in the vehicle structure that the axle is free to swing and tilt without restriction and, if driven, free to move without causing the angles between propeller shaft sections to become too great. The primary object of this invention is to provide a torque-resisting arrangement of the above character.

Heretofore, three general methods have been utilized for counteracting torque reactions in road vehicles. One of these methods consists in connecting the torque-creating axle with the chassis frame (or with either the frame or trunnion mounting in a tandem-axle construction) in such manner that the loaded frame opposes the torque reactions. Another method lies in the provision of interconnections between the tandem axles of a multi-wheel vehicle, whereby the reactions of one are opposed or neutralized by the other. Neither of these methods is entirely satisfactory, since the axles may not partake of an unhampered independent swinging movement unless the torqueing devices are of complicated and extremely flexible design, and because the propeller shaft angularity may become so great as to create inefficiency and destructive stresses. Moreover, the stresses imposed upon the axles or axle housings are not uniformly distributed.

The third method above referred to is that of resisting torque through the suspension system of the vehicle as, for example, in the well-known Hotchkiss drive arrangement. Here again, however, due to the fact that the axle ends are rigidly carried by elements of the suspension, the propeller shaft angularity becomes excessive as the axle or axles swing, and the axles cannot swing or tilt without twisting the suspension elements or subjecting them to destructive stresses. It has been proposed to improve this general type of apparatus by freeing one end of the axle so that it may rotate with respect to the suspension. (In the case of tandem axles, freeing the diagonally opposite axle ends, thus leaving the other diagonally opposed ends rigidly connected with the suspension to transmit torque to the latter.) This constitutes an improvement to the extent that each axle is free to swing, but still it is incapable of tilting transversely without subjecting the suspension elements to twisting stresses. Finally, to remedy the latter conditions, it has been proposed to provide universal connections, such as ball hangers at the axle ends to join the latter with the suspension, so designed that one axle end is free to rotate and the other is prevented from so doing. (In a tandem axle combination, one set of diagonally opposite axle ends being free and the other set being adapted to react against the suspension to resist axle rotation.)

While the above mentioned improvements on the third method (Hotchkiss drive type) result in freedom of axle oscillation and tilting, they do not eliminate excessive angularity in the propeller shaft, and they result in an undesirable construction wherein the axles or axle housings, and the suspensions are subjected to non-uniform and undivided twisting stresses, due to the fact that each axle is secured against rotation at only one of its ends. Hence the axle housings and suspension elements must be relatively large and heavy in order to withstand the destructive stresses that are imposed upon them.

Accordingly, major objects of the present invention are to provide a vehicle in which the axles are free to swing and tilt and to have their torque reactions uniformly opposed and equalized at both side of the frame, and in which the angularity of the propeller shaft or its sections is relatively slight.

Further important objects, some of which contribute to the attainment of the results sought by the foregoing objects, and others of which in themselves involve further and distinct desirable and valuable features, are as follows:

It is an object of my invention to transmit torque reactions to the suspension adjacent both ends of an axle without, however, subjecting the suspension elements to destructive influences. In this connection it is a further object to provide a practicable tandem axle construction in which the axles are interconnected by a suspension system in such manner that the torque reactions of each axle are divided and transferred, adjacent the axle ends, to the suspension system.

A further object of this invention is to divide the torque reactions of an axle substantially equally and to transmit the divided portions respectively to the two sides of the vehicle frame.

Closely related to this object is that of devising a multi-wheel vehicle in which the torque reactions of one of a pair of tandem axles are uniformly transferred to a suspension system and thence to the other axle.

Another important object of the present invention is to provide, in a multi-wheel vehicle, a torque-resisting mechanism so designed and arranged that the driving torque reactions of one of the axles will increase the traction of all of the wheels supporting said axle.

A further object resides in the provision of new and improved universal joints for interconnecting a suspension system and the axles of a vehicle and, in this connection, in the provision of a non-resilient and non-deformable universal joint for transmitting torque reactions from the ends of a vehicle axle to the vehicle suspension.

Other objects of my invention will appear from a study of the following detailed disclosure and the accompanying drawings forming part of the same. In the drawings, Figure 1 is a plan view of one end of a multi-wheeler chassis, showing one manner of incorporating a preferred form of this invention in a tandem axle unit to resist and equalize torque reactions.

Figure 2 shows, partly in section and partly in elevation, the rear end of the rearmost axle of Figure 1, with the wheels broken away.

Figure 3 is a detailed longitudinal sectional view, taken substantially along the irregular line 3—3 Figure 2, to show my non-resilient universal joint.

Figure 4 represents a plan view similar to Figure 1 but showing a different arrangement with a modified type of torque-resisting device incorporated therein.

Figure 5 is a view, partially in section, as seen when looking toward the rear end of the assembly of Fig. 4.

Figure 6 is a sectional view corresponding with Figure 3 but showing a modified form of spring and axle interconnection, involving a different type of universal joint.

Figure 7 is a detailed sectional view, of the joint housing of Figure 6 with the torqueing spider and deformable rubber elements removed therefrom, looking down upon the horizontal plane indicated by numeral 7 in Figure 6.

Figure 8 constitutes a detail showing in plan, of the torqueing spider of Figure 6.

Figure 9 is a detail showing, in side elevation, of one of the deformable rubber elements of Figure 6.

Figure 10, disclosing another modification, shows the universal joint of Figure 6 mounted in a housing that is modified for two-point connection with a leaf spring beam.

Figure 11, representing a still further modification, illustrates the form of Figure 10 modified to provide a single point connection between the joint housing and the end of a spring beam, with stabilizing mechanism added to resist torque reactions.

With reference now to the drawings, in which like numerals are employed to designate like parts, and with particular reference to Figures 1, 2 and 3:

Numeral 12 indicates the rear end of a vehicle chassis frame, beneath which is disposed a pair of tandem axles 13 supported by wheels 14. Each axle 13 comprises a central differential housing section 15 into the opposite ends of which a pair of shaft housings 16 project with a tight fit to form therewith the rigid complete axle housing proper. Live shafts 17 are disposed within housings 16, their outer ends driving the wheels 14 and their inner ends being differentially driven in a conventional manner by mechanism (not shown) within the differential housings 15. A propeller shaft 18 extends rearwardly and, by way of a slip joint 19, a universal coupling 21 and a shaft section 22, drives the mechanism within the forward differential housing. The shaft section 22 projects through the last-named housing in the form of a through drive for connection with the rear axle. In this respect the axles 15 differ, the rear housing being closed by a plate 23. The driving inter-connections between the axles comprise a flexible coupling 24 on the rear end of shaft 22, a pair of spaced slip joints 25 inter-connected by a shaft section 26, a second flexible coupling 27 and a short shaft 28 extending from coupling 27 into the rear differential housing.

A transverse trunnion shaft 29 is arranged between the axles in parallelism therewith, its ends being secured to the chassis frame by supporting brackets 31. At its center the trunnion has a portion cut away to permit free angular movement of the drive shaft section 26, the cut ends of the trunnion shaft being reunited by a U-shaped splicing member 32. At each side of the frame an end of the trunnion projects outwardly to provide a pivot for oscillatably receiving the intermediate portion of a load-supporting spring assembly 33. This particular spring assembly is illustrated and described in detail in my copending application, Ser. No. 431,882, filed February 27, 1930. In brief, it comprises a special beam 34 centrally pivoted about the trunnion axis, a pair of oppositely directed arms 35 freely projecting into the ends of the beam 34 and oscillatable independently thereof about the trunnion axis, and a pair of rubber bodies 36 individual to each arm 35 and so related thereto that neither arm can swing without cooperating with beam 34 to deform some of the cushioning rubber material. The free ends of the arms 35 are adapted to be connected to the ends of the axles to permit the axles to swing and tilt with respect to the trunnion axis and to transmit torque and road shocks through the suspension to each other and to the frame. The devices for interconnecting the axles and the free ends of arms 35, and the means for interconnecting such devices, comprise the essential subject matter of this invention and will now be described.

The free end of each arm 35 terminates in an integral, substantially semi-cylindrical housing member 37. A semi-cylindrical cap 38 is secured by means of bolt assemblies 39 upon said member 37 to form therewith a complete cylindrical housing for mechanism about to be described. Each axle end projects through one of these complete housings and the shaft housing 16 thereof has journaled thereon a sleeve or hanger 41 of special formation. The inner end of this sleeve abuts a cylindrical end 42 of the differential housing and its outer end extends through the housing 37, 38 in concentric relation thereto. Within said housing the sleeve has an enlarged portion 43 upon which are formed four convex, cylindrically curved surfaces 44, 45, 46 and 47. The surfaces 44 and 45 are generated about a horizontal line passing through the axis of shaft 17 at right angles thereto, and the surfaces 46 and 47 are generated about a vertical line normal to said horizontal line. The radii of generation of all the surfaces are equal. The enlarged portion 43 thus forms, in effect, a square block having its sides cylindrically curved. The corners of the block are cut away and may be curved, as at 48. At each side of the block 43 the sleeve 41 is provided with a spherical segment 49 for a purpose that will appear later.

Fitted within the housing 37, 38, with its peripheral surface in direct engagement therewith, there is a cylindrical ring 51 having its internal surface of parallelopiped shape to provide four smooth flat seats 52, 53, 54 and 55 spaced from and adjacent to the cylindrical surfaces 44, 45, 46 and 47 respectively of the block 43. Four wearing and reactance strips 56, 57, 58 and 59 are provided, for insertion, in the order just given between the four seats and the four corresponding cylindrical surfaces. Each strip is flat on one side to make sliding contact with its seat, and is curved on its opposite side to slidably conform to the corresponding cylindrical surface on the block 43. The strips 56 and 57 are provided with oil grooves, as indicated. The strips 58 and 59 (see Figure 3) carry integral horizontal spindles 61 which are journaled into the ring 51. These spindles are utilized to locate the parts in their illustrated position during the assembling operation and in addition, one of them projects into the housing 37 to aid in locking the ring 51 against rotation relative to spring arm 35. Each of the above described assemblies is now completed by drawing a pair of annular plates 62 against the side surfaces of ring 51 by means of a plurality of bolts 63. The inner edges of plates 62 are shaped for a universal fit upon the surfaces of the spherical segments 49 of the sleeve 41. These plates 62 serve to exclude dust and grit from the working parts of the mechanism and to retain lubricant within the housing in the free spaces adjacent said working parts.

The mechanism above described forms a square type universal joint comprised wholly of non-deformable parts in positive engagement with each other. As an axle swings or tilts during vehicle operation, it is permitted to do so without twisting the spring arms 35 or subjecting them to destructive stresses. This result is attained because the sleeves 41 (which tilt as the axle ends move up and down) are universally mounted, by way of their blocks 43 and the corresponding wearing strips, within the rings 51. Complete universal movement at each joint is permitted, one pair of opposing cylindrical surfaces being unable to lock the mechanism when oscillation takes place about the other pair of opposed cylindrical surfaces, due to the fact that the wearing strips may partake of sliding planetary movement upon their flat seats. The sleeve 41, however, is not permitted to rotate about its longitudinal axis, since the block 43 and the wearing strips are locked against rotation with respect to ring 51, and the latter is fixed relative to the housing 37, 38 and spring arm 35. But the live shaft housing 16 is free to rotate within sleeve 41 and hence, if the driving torque reactions are to be transferred to the frame via the spring suspension, some means must be provided for interconnecting the sleeves 41 with the axles in such manner that the former may resist rotation of the latter. Such means are provided, as follows:

Each sleeve 41 has, adjacent its end abutting the differential housing, an eccentric annular flange 64 provided at the top with an opening 65. The openings 65 slidably receive the ball-shaped ends 66 of torque transferring and equalizing rods 67. There is one of these rods 67 for each axle, extending longitudinally thereof and having its mid-portion 68 pivoted on a bolt 69 that projects rigidly outwardly from the differential housing. A nut 71 maintains the rod in position upon the bolt. It will be observed that, as the axle assembly tends to rotate in response to driving or braking reactions, it is prevented from so doing because its bolt 69 is engaged by the torque rod 67 and the ends of the latter are received in the non-rotatable sleeve flanges 64. The rod 67 is called a "torque equalizing" rod because it is arranged to divide the transferred torque reactions uniformly between the suspensions at the opposite sides of the vehicle frame.

It is important that the connections at the spring ends be journaled with respect to the ends of the axle housings since, if either connection were pinned or otherwise secured and the corresponding axle end should rise as its supporting wheel passed over a hump in the road, the rising end of the axle would be forced to oscillate a certain amount about its axis. The resulting axle oscillation would cause a relatively large angularity in the propeller shaft sections driving that particular axle. In the arrangement of this invention, however, where all the sleeves 41 are free on the axle ends and each torque rod 67 is centrally pivoted to inter-connect its corresponding sleeves, the rotation of the axle due to tilting thereof is only one-half of that in the construction discussed above, whereby the resulting propeller shaft angularity is greatly and desirably reduced. This is an inherent characteristic whenever a "torque equalizing" device is incorporated in the combination in the general manner disclosed in this application.

In the arrangement illustrated in Figure 1, the torque reactions of the rearmost axle are so transferred to the frame that they react through the suspension against the trunnion shaft 29 with a tendency to lift the latter, thereby increasing the traction of both of the rearmost wheels. This is not broadly new, since the same result may be secured in a non-flexible tandem axle arrangement where one axle is driven in the Hotchkiss manner with its ends rigidly connected to the suspension elements. A similar result may be obtained in a more flexible arrangement wherein only one end of the driven axle is secured to the suspension system for torque transfer, but in such event the traction can be increased upon only one wheel of said driven axle. Hence what is claimed as novel is the combination of a tandem axle arrangement involving a driven axle having its ends flexibly supporting the load through the suspensions and yet designed to transfer torque reactions through said suspensions.

Figures 4 and 5 are presented to illustrate another of various types of torque equalizing devices that may be constructed in accordance with the principles of this invention, and to show a tandem axle arrangement wherein the increased traction, discussed above, may be utilized to great advantage. It will readily be appreciated that, to increase the traction of the set of wheels of one axle, some of the load upon the other set of wheels must be removed and transferred to the first mentioned set of wheels. Hence, to obtain any marked advantage, the first mentioned set should comprise driven wheels and the other set should be non-driven or idle wheels. Such an arrangement is disclosed in Figs. 4 and 5, below described.

Figure 4 corresponds with Figure 1 except for the substitution of a dead axle 72 for the front driven axle 13 of Figure 1, the substitution of a modified torque equalizer, and a modification of the arrangement for actuating the short shaft 28 of the rear driven axle. In Figures 4 and 5 the two sections of the trunnion shaft are arranged in the plane of the axles (under normal load conditions) with their outer ends supported in the frame-carried brackets 31. The inner ends of the trunnion sections project for support into the walls of a gear casing 73 that is rigidly carried by a cross frame member by means of a casing flange 74.

A propeller shaft 75 extends rearwardly from the power plant of the vehicle into proximity with the gear casing 73 and is connected with gearing in the top of said casing by means of a slip point 76, coupling 77 and short shaft 78. The mechanism (not seen) within the casing comprises a central universal joint and gearing or similar driving connection of any suitable type, and is designed to drive the shaft 28 of the rear driven axle through the medium of a shaft section 79 that projects from the lower end of the gear casing into the slip joint 25 of the flexible coupling 27. An oscillatable framework 81, having a pair of hub portions 82 pivoted upon the trunnion shaft, is adapted to support the propeller shaft section 79, 25, where it leaves the gear casing, and to freely swing with said section relative to said casing as the driven axle swings and tilts. Any other suitable mechanism for driving the rear axle 13 might be employed, the illustrated form having been selected merely because it is suitable and because it eliminates much spline shaft travel and angularity.

The torque equalizing mechanism for the rear driven axle comprises an equalizing rod 83 having bifurcated ends 84 which pivotally receive, as at 85, the ends of a pair of arms 86 that are integrally formed with another pair of arms 87 to provide rigid bell cranks that are pivoted about bolts 88 which are rigidly carried by the axle housing. The arms 87 are slidably received in the openings 66 of the flanges 64 of the sleeves 41 (previously described in detail in connection with Figures 1 to 3). In this arrangement, as one end of the axle rises or falls to cause rotation of its sleeve 41 with a resulting oscillation of the corresponding bell crank about its pivot 88, the rod 83 reciprocates in parallelism with the axis of the axle and tends to oscillate the other bell crank about its pivot 88. But, since the other sleeve 41 cannot rotate under this particular condition, it provides a fixed fulcrum for the end of its bell crank arm 87 as a result of which the axle housing is caused to oscillate in the same direction that the rising sleeve 41 was originally rotated. Due to the action of the equalizing rod 83, however, this axle oscillation (about its own axis) is only one half that of the sleeve 41, and hence the angularity of the propeller shaft sections is always desirably slight during tilting movements of the axle.

The torque equalizer just described likewise functions in all other respects like that of Figures 1 to 3. It divides all reactions equally between the suspensions at the opposite sides of the frame. It acts, as the axle housing tends to rotate clockwise (in Figure 4) in response to driving torque, to rotate sleeves 41 in the same direction with a resulting tendency to lift the trunnioned ends of the rear spring arms 35 upwardly. As a consequent result, a portion of the load is shifted from the front wheels to the rearmost wheels to increase the traction of the latter. It should be observed that this increase is greatest when it is most needed, as when starting the vehicle or moving slowly with difficulty. The arrangement is quite practical, due to the fact that the front axle 72 is dead and supported by a pair of idle wheels 89.

Although the same type of torque-resisting mechanism is shown in combination with both the driven and dead axles, it will be understood that any type of mechanism, conventional or otherwise, may be substituted for that of the dead axle, and that none is necessary where the idle wheels are not braked. It is preferable, however, to apply brakes to the idle wheels and to equalize the braking torque reactions between the two spring suspensions. The equalizing torque device of Figures 1 to 3, or any other operating on similar principle, may be substituted for that of Figures 4 and 5.

With reference now to Figures 6 to 9 inclusive there is illustrated a modified form of universal joint which, due to its inherent nature, may be utilized either with or without the torque-equalizing devices heretofore described. In the form shown, however, it is designed for direct interlocked engagement with an axle end. Figure 6 is very similar to Figure 3 in that it includes a spring arm 35 rigidly supported by a cylindrical joint housing 37, 38; and a line shaft 17 and its housing 16 projecting through said cylindrical housing in axial alinement therewith. The mechanism for providing a torque-transferring universal joint between the axle housing 16 and the cylindrical housing 37, 38 is as follows:

A torqueing spider 90, comprising a hub 91 and four integral and radial arms 92, has said hub keyed upon the axle shaft, as at 93. The tips of the arms 92 are sufficiently spaced from the cylindrical wall of the enclosing housing to clear the same at all times during operation. The side edges of the arms 92 merge into a pair of circular flanges 94 which cooperate with the arms to form four radial pockets 95 (see Figure 8), and which close the open ends of the cylindrical housing 37, 38. Each of these pockets receives a rubber interlocking element 96, each element comprising a trough-shaped body 97 rounded as at 98 on its convex side and provided with two opposed sets of spherically curved protuberances 99 and 101. The rounded surface 98 abuts the spider hub 91 and the protuberances 101 rest in complemental depressions 102 in the radial walls of the spider arms 92. Individual to each rubber element 96 there is provided a load supporting and reactance block 103. Each block, (see also Figure 7), is shaped substantially like a triangular prism, one of its sides being fitted within a slot 104 in the inner wall of cylindrical housing 37, 38 and locked therein by set screws 105, and its other two sides projecting and converging into the trough of the corresponding rubber element 96. These converging sides of the prismatic block have depressions 106 which receive the spherical protuberances 99 of the rubber.

From the foregoing description it will be seen that the load is supported, through the spring 33, the housing 37, 38, and the triangular blocks 103, directly upon the protuberances 99 of the rubber elements 96, and is thence transmitted to the axle housing 17 by way of the spider 90 which takes it from the rubber elements at the depressions 102. The rubber elements, of course, cushion road shocks, but their primary function is that of transmitting torque reactions from the spider (which is keyed to the axle at 93) to the spring suspension by way of the prisms 103, and this without in any way hampering the flexibility of the apparatus. Being resilient and deformable, these rubber elements permit the axle to swing and tilt without subjecting any of the apparatus to destructive stresses. The free universal movement thus permitted renders it possible to resist the torque reactions at both ends of each and every axle of the vehicle. During movement of an axle end relative to the suspension, the ball protuberances 99 and 101 of the rubber elements have a rolling and sliding action upon their seating depressions 106 and 102 of the prisms and spider respectively. If desired, one may remove the keys 93 to permit the spiders to rotate relative to the axle housing, and then interconnect the spiders of the axle by a torque equalizing device in the same manner that sleeves 41 were interconnected in the forms shown in Figures 1 to 5 inclusive.

In Figure 10 I have illustrated the torque-resisting universal joint of Figure 6 slightly modified for incorporation in a conventional suspension of the leaf spring type. In Figure 6 the housing 37, 38 was adapted to transfer torque reactions to the suspension because of its integral connection with spring arm 35. In the contemplated modification, however, it becomes necessary to provide two or more points of interconnection in order to stabilize the axle and resist its rotation. To this end, in Figure 10, I replace the housing 37, 38 with a similar two-part housing 107, 108 having a rigid, downwardly offset extension 109 which carries a pair of horizontal bolts 112. These bolts provide pivotal and stabilizing supports for the curled ends of two of the leaves 113 and 114 of a spring beam 115. The latter may be connected to the vehicle frame in any conventional manner somewhat as in Figure 11, for example.

With reference now to Figure 11, wherein there is shown a multiwheel arrangement embodying a type of torque-resisting universal joint very similar to that of Figures 6 and 10, each joint housing consists of a pair of complemental semi-cylindrical units 116 and 117 rigidly clamped together by stud bolts 118. Each unit 117 includes an integral depending lug 119 carrying a horizontal pin 121 which pivotally receives one end of a spring beam 122. Intermediate the ends of the spring beam a bracket 123 is secured to the frame 12 and projects downwardly to receive the end of a transverse trunnion shaft 29. A load-supporting assembly 124, including U-bolts 125 for clamping the spring beam thereto, is pivotally mounted upon the end of said trunnion shaft. Integrally formed with assembly 124, and in parallelism with the spring beam, is a pair of arms 126, each of which projects from the trunnion toward one of the axles. Each upper housing unit 116 has an integral lug 127 extending toward one of the arms 126. A stabilizing and torque transferring link 128 interconnects each lug 127 with the projecting end of its corresponding arm 126, this interconnection being rendered flexible by the provision of pivot pin connections 129 and 131.

The apparatus just described operates in substantially the same manner as that of the other illustrated forms. The links 128 stabilize the arrangement and cause a push-and-pull torque transfer from the axles to the frame at the trunnion mounting. Their flexible connections cooperate with the universal joints to permit free and unhampered movement of the truck elements. It will, of course, be understood that the non-resilient universal joint of Figure 3 may be substituted for that illustrated in Figures 10 and 11, and that torque equalizers may be incorporated in the last mentioned forms, if desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. In combination with a vehicle frame, an axle; means supporting the frame upon said axle, said means including nonrotatable elements individual to the ends of said axle and surrounding the latter; and nondeformable means interconnecting both ends of said axle with said elements and encompassed by the latter in a manner to resist torque reactions while permitting universal movement between said axle and said nonrotatable elements.

2. In the combination defined in claim 1, each of said non-deformable means comprising a universal joint including members in positive contact with each other and positively interconnected with said axle and said non-rotatable elements, and said supporting means including a single spring attached to the frame at each side thereof and having torque transmitting connection with the corresponding non-rotatable element.

3. In combination with a vehicle frame, a set of tandem axles disposed beneath one end of said frame; a suspension system supporting said frame end upon said axles, said system including torque-resisting collars designed for connection with the ends of said axles; and non-deformable universal joints at both ends of at least one of said tandem axles for inter-connecting said ends with said collars; said joints being designed to permit universal movement of said axle with respect to said collars and to transfer torque reactions to the latter.

4. In combination, a vehicle frame; an axle disposed beneath said frame transversely thereof; torque-transfer means at each side of said frame to transmit torque reactions from the axle to the frame; and torque-equalizing means interconnecting said axle and said transfer means to divide the torque reactions of the axle between the torque-transfer means at opposite sides of the frame.

5. In the combination defined in claim 4, said axle comprising a swinging drive axle; a shaft including flexibly connected sections for driving the mechanism of said drive axle; said torque-transferring and equalizing means being designed, upon swinging movement of one end of said axle through a vertical arc, to reduce the resulting axle rotation about its own axis to an angle substantially half as great as that of said arc, whereby the angularity of said shaft sections is not appreciably changed.

6. In combination, a vehicle frame; an axle disposed beneath said frame transversely thereof; a suspension system for mounting said frame upon said axle; said system including means, at each side of said frame, designed to transmit torque reactions from said axle to the frame; and torque-equalizing means interconnecting said axle and said transmitting means to divide the torque reactions uniformly between said transmitting means at opposite sides of the frame.

7. In the combination set forth in claim 6, said means for transmitting torque reactions including devices permitting swinging and tilting of the axles without subjecting said suspension system to destructive stresses.

8. In combination with a vehicle frame, a set of tandem axles disposed beneath said frame; means between the frame and each end of each axle designed to transfer torque reactions to the frame; and a torque equalizer for at least one of said axles, said equalizer comprising means interconnecting said one axle and said transfer means to divide the torque reactions of said one axle for transmission to both sides of said frame.

9. In the combination specified in claim 8, said means for transferring torque reactions to the frame comprising part of a suspension system for supporting said frame upon said axles.

10. In combination with a vehicle frame, an axle disposed beneath said frame transversely thereof; a device rotatably mounted on each end of said axle; torque-equalizing means secured to said axle and interconnecting said devices to tend to rotate the same upon rotation of said axle about its own axis; and means connecting said devices to the frame in a manner to resist rotation of said devices.

11. In the combination defined in claim 10 said torque-equalizing means comprising a rod centrally pivoted upon said axle and connected to said devices at its ends.

12. In the combination set forth in claim 10, said torque-equalizing means comprising a pair of equalizers, each pivoted upon said axle adjacent one of said devices, and means interconnecting said equalizers.

13. In combination with one side of a vehicle frame; a transverse axle having one of its ends disposed below said side of the frame; a suspension mounting said side upon said axle end and designed for cooperation with said frame to resist torque reactions; said suspension including a non-rotatable housing member receiving said axle end, and a non-deformable and non-resilient universal joint interconnecting said housing and said axle end in a manner to transmit torque reactions of the latter to the former while permitting relative universal movement therebetween.

14. In combination with one side of a vehicle frame, a transverse axle having one of its ends disposed below said side of the frame; a suspension mounting said side upon said axle end and designed for cooperation with said frame to resist torque reactions; and a non-deformable and non-resilient universal joint interconnecting said suspension and said axle end in a manner to transmit torque reactions of the latter to the former while permitting relative universal movement therebetween; said non-deformable joint comprising a sleeve journaled on said axle end, connected to said axle and including an enlarged portion having a plurality of cylindrically curved surfaces generated about axes that intersect the axis of said axle, and means universally mounted on said enlarged portion and connected with said suspension.

15. In combination with one side of a vehicle frame, a transverse axle having one of its ends disposed below said side of the frame; a suspension mounting said side upon said axle end and designed for cooperation with said frame to resist torque reactions of said axle; and a deformable type universal joint interconnecting said suspension and said axle end in a manner to transmit torque reactions of the latter to the former; said universal joint comprising a spider non-rotatably carried by said axle end and means resiliently interlocking said spider with a portion of said suspension.

16. In the combination defined in claim 15, said spider forming a plurality of radial pockets; and said interlocking means comprising deformable rubber members mounted within said pockets, and reactance members carried by said suspension and projecting into engagement with said rubber members.

ALDEN G. RAYBURN.